(12) United States Patent
Williams

(10) Patent No.: US 10,382,627 B2
(45) Date of Patent: *Aug. 13, 2019

(54) SYSTEM AND METHOD FOR CONTACT INFORMATION INTEGRATION WITH SEARCH RESULTS

(71) Applicant: Virtual Hold Technology Solutions, LLC, Akron, OH (US)

(72) Inventor: Mark J. Williams, North Canton, OH (US)

(73) Assignee: Virtual Hold Technology Solutions, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,133

(22) Filed: Jul. 17, 2018

(65) Prior Publication Data

US 2019/0052755 A1 Feb. 14, 2019

Related U.S. Application Data

(63) Continuation of application No. 14/810,493, filed on Jul. 28, 2015, now Pat. No. 10,027,806, which is a continuation of application No. 14/178,589, filed on Feb. 12, 2014, now Pat. No. 9,094,516, which is a continuation of application No. 13/951,429, filed on Jul. 25, 2013, now abandoned, which is a continuation-in-part of application No. 13/843,688, filed on Mar. 15, 2013, now abandoned, which is a continuation-in-part of application No. 13/659,902, filed on Oct. 24, 2012, now Pat. No. 8,938,221, which is a continuation-in-part of application No. 13/479,870, filed on May 24, 2012, now Pat. No. 9,055,149, and a continuation-in-part of application No. 13/446,758, filed on Apr. 13, 2012, now Pat. No. 8,792,866, which is a continuation of application No.

(Continued)

(51) Int. Cl.
*H04M 3/523* (2006.01)

(52) U.S. Cl.
CPC ....... *H04M 3/5231* (2013.01); *H04M 3/5238* (2013.01)

(58) Field of Classification Search
None
See application file for complete search history.

(56) References Cited

U.S. PATENT DOCUMENTS

| | | | |
|---|---|---|---|
| 9,094,516 B2* | 7/2015 | Williams | H04M 3/5238 |
| 10,027,806 B2* | 7/2018 | Williams | H04M 3/5231 |

(Continued)

*Primary Examiner* — Antim G Shah
(74) *Attorney, Agent, or Firm* — Brian S. Boon; Brian R. Galvin; Galvin Patent Law, LLC

(57) ABSTRACT

A system for providing integrated contact information with search results, comprising a plurality of contact centers, each comprising at least a plurality of contact agents; a callback cloud, comprising at least a plurality of contact agents; a queue manager, comprising at least a software components operating and stored on a computing device; wherein the contact agents receive and respond to customer interactions; further wherein the queue manager monitors contact agent availability; further wherein the queue manager receives interaction requests; and further wherein the queue manager provides queue information to interaction requestors.

7 Claims, 13 Drawing Sheets

Related U.S. Application Data

12/320,517, filed on Jan. 28, 2009, now Pat. No. 8,213,911.

(56) References Cited

U.S. PATENT DOCUMENTS

| | | | |
|---|---|---|---|
| 2004/0028213 A1* | 2/2004 | Goss | H04L 29/06 379/265.09 |
| 2007/0198368 A1* | 8/2007 | Kannan | G06Q 10/0631 705/26.41 |

* cited by examiner

SYSTEM AND METHOD FOR CONTACT INFORMATION INTEGRATION WITH SEARCH RESULTS

CROSS-REFERENCE TO RELATED APPLICATIONS

This application is a continuation of U.S. patent application Ser. No. 14/810,493, filed on Jul. 28, 2015 and titled "SYSTEM AND METHOD FOR CONTACT INFORMATION INTEGRATION WITH SEARCH RESULTS", which is a continuation of U.S. patent application Ser. No. 14/178,589, filed on Feb. 12, 2014 and titled "SYSTEM AND METHOD FOR CONTACT INFORMATION INTEGRATION WITH SEARCH RESULTS", now issued as U.S. Pat. No. 9,094,516 on Jul. 28, 2015, which is a continuation of U.S. patent application Ser. No. 13/951,429, filed on Jul. 25, 2013 and titled "SYSTEM AND METHOD FOR CONTACT INFORMATION INTEGRATION WITH SEARCH RESULTS", which is a continuation-in-part of U.S. patent application Ser. No. 13/843,688, filed on Mar. 15, 2013 and titled "SYSTEM AND METHOD FOR CONTACT INFORMATION INTEGRATION WITH SEARCH RESULTS, which is a continuation-in-part of U.S. patent application Ser. No. 13/659,902, which was filed on Oct. 24, 2012 and titled "SYSTEM AND METHOD FOR PROVIDING A CALLBACK CLOUD," now issued as U.S. Pat. No. 8,938,221 on Jan. 20, 2015, which is a continuation-in-part of U.S. patent application Ser. No. 13/479,870, which was filed on May 24, 2012 and titled "MANAGING, DIRECTING, AND QUEUING COMMUNICATION EVENTS USING IMAGE TECHNOLOGY", now issued as U.S. Pat. No. 9,055,149 on Jun. 9, 2015, which is a continuation-in-part of U.S. patent application Ser. No. 12/320,517 which was filed on Jan. 28, 2009 and titled "A MOBILE COMMUNICATION DEVICE FOR ESTABLISHING AUTOMATED CALL BACK", now issued as U.S. Pat. No. 8,213,911 on Jul. 3, 2012, the specification of each of which are hereby incorporated by reference in their entirety.

This application is a continuation of U.S. patent application Ser. No. 14/810,493, filed on Jul. 28, 2015 and titled "SYSTEM AND METHOD FOR CONTACT INFORMATION INTEGRATION WITH SEARCH RESULTS", which is a continuation of U.S. patent application Ser. No. 14/178,589, filed on Feb. 12, 2014 and titled "SYSTEM AND METHOD FOR CONTACT INFORMATION INTEGRATION WITH SEARCH RESULTS", now issued as U.S. Pat. No. 9,094,516 on Jul. 28, 2015, which is a continuation of U.S. patent application Ser. No. 13/951,429, filed on Jul. 25, 2013 and titled "SYSTEM AND METHOD FOR CONTACT INFORMATION INTEGRATION WITH SEARCH RESULTS", which is a continuation-in-part of U.S. patent application Ser. No. 13/843,688, filed on Mar. 15, 2013 and titled "SYSTEM AND METHOD FOR CONTACT INFORMATION INTEGRATION WITH SEARCH RESULTS, which is a continuation-in-part of U.S. patent application Ser. No. 13/659,902, which was filed on Oct. 24, 2012 and titled "SYSTEM AND METHOD FOR PROVIDING A CALLBACK CLOUD," now issued as U.S. Pat. No. 8,938,221 on Jan. 20, 2015, which is a continuation-in-part of U.S. patent application Ser. No. 13/446,758, which was filed on Apr. 13, 2012 and titled "COMMUNICATION DEVICE FOR ESTABLISHING CALL BACK", now issued as U.S. Pat. No. 8,792,866 on Jul. 29, 2014, which is a continuation of U.S. patent application Ser. No. 12/320,517 which was filed on Jan. 28, 2009 and titled "A MOBILE COMMUNICATION DEVICE FOR ESTABLISHING AUTOMATED CALL BACK", now issued as U.S. Pat. No. 8,213,911 on Jul. 3, 2012, the specification of each of which are hereby incorporated by reference in their entirety.

BACKGROUND OF THE INVENTION

Field of the Invention

The invention relates to the field of software applications, and more particularly to the field of integrating human interaction software with corporate communication systems.

Discussion of the State of the Art

Companies know that consumers (customers and future customers) turn to search engines when they are looking for information, so they are heavily investing in website design, search engine optimization, mobile, and online marketing to ensure that they are found during the search . . . and that they are providing a channel of communication that is easy to use and navigate. The easier it is for a consumer to find a company, and navigate through the information, the more likely they will be to use the technology and become and/or stay a customer. However, with the rapid growth in search engine use it is truly surprising how most companies are still behind in delivering an effective and easy to use online experience for consumers. According to *Econsultancy MultiChannel Customer Experience report* "Only 26% of companies have a well-developed strategy in place for improving the search and online customer experience". Also, "40% of organizations cite 'complexity' as the greatest barrier to improving multichannel online customer experiences". This complexity and lack of simple online strategies is leading to poor customer experiences and frustration, and costing organizations a lot of money. According to *Parature Customer Service Blog*, "poor online customer experiences result in an estimated $83 Billion loss by US enterprises each year because of webpage defections caused by poor design, lack of contact information or links for assistance, and abandoned purchases from web order pages".

Search engine and online use by consumers is growing rapidly, and companies are trying to keep up to capture this audience. However, what companies seem to forget, or ignore, is the fact that when it comes to customer service most consumers actually prefer to speak with someone. According to the *American Express* 2011 *Global Customer Service Barometer* "90% of US consumers prefer to resolve their customer service issues through live communication with a customer service representative via the telephone, rather than through online chat, email, text messaging, or even face to face." Companies have approached their multichannel strategies as an extension of their self-service strategy, so they tend to make it difficult for the consumer to actually speak with someone. Typically the phone number is hidden on a page several layers deep within the site, in very small font, and it usually does not show up in the results through a search engine, forcing the consumer to go to the website and search for the number. This "self-service" approach to their web strategy may be viewed as a solution in providing information and value to the consumer, but when it comes to allowing your customers to contact you this overall strategy has resulted in complaints, defections, and ultimately lost revenue.

What is needed, is a means to retrieve and integrate a company's contact information in search results, facilitating a much more efficient and user-friendly "one click" means of contacting a business after locating their information in an Internet search.

SUMMARY OF THE INVENTION

Accordingly, the inventor has conceived and reduced to practice, in a preferred embodiment of the invention, a system and method for retrieval and integration of contact information within displayed search results.

According to a preferred embodiment of the invention, a system for providing integrated contact information with search results comprising a queue manager, that may monitor contact agent activity or availability such as to maintain queue information for processing of contact requests, and that may also provide such queue information to interaction requestors, is disclosed. According to the embodiment, a plurality of contact agents may receive and respond to customer interactions (such as taking customer service phone calls, or responding to e-mail or instant message-based communications, as may be appropriate to the nature of a particular interaction), and such agents may be distributed such as in a plurality of contact centers or in a cloud-based or similar distributed or remote organization, such that contact agents may interact with customers regardless of physical location or logical arrangement. According to the embodiment, a queue manager may monitor agent statistics such as (for example) scheduling, training or skill sets, or current availability. A queue manager may also monitor overall contact center or cloud operations, such as call volume (number of calls being taken in a given timeframe, or various derivative statistics such as average call quantity or peak periods of activity), such as to maintain a "virtual queue", not only of individual agent availability but also of overall contact center operations. In this manner, a queue manager may maintain a relevant measurement of contact center operations with sufficient granularity as to allow for trend analysis or statistic gathering on specific agents as well. According to the embodiment, a queue manager may provide this information in response to interaction requests, such as to notify a requestor of current availability-such as, for example, providing an estimated wait time for an agent to become available, or providing the number of available agents trained to handle a particular interaction request. In this manner, a queue manager may receive interaction requests and provide relevant information to assist the requestor, rather than a simple interaction denial if no agents are available. Furthermore, a queue manager may provide interactive indicia (such as clickable buttons, or other interactive interface elements common in the art) to a requestor, such as to enable them to take action based on queue information received. For example, if no agents are available, a requestor might be given an interactive option to schedule a future interaction request. It should be appreciated that such functionality is described as exemplary, and a variety of indicia and interactive functions may be utilized according to the invention. It should be further appreciated that as described, a queue manager may handle queue information and interaction requests for a plurality of contact centers or cloud-based agents. Such an arrangement is exemplary, and additional or alternate arrangements may be utilized according to the invention (such as contact centers with dedicated queue managers, or queue managers that optionally may interact with each other for more efficient information availability and presentation).

According to a further embodiment, a requestor may be a search engine such as various internet-based search providers common in the art. According to the embodiment, a search engine may request information form a queue manager as part of a search query, such as when a user searches for corporate contact information. According to the embodiment, a search engine may submit query information to a queue manager, such as corporate identification information from a search query, such that a queue manager may identify relevant contact agents. Queue manager may then provide any relevant queue information, such as agent availability or hours of operation, and may furthermore provide interactive indicia such as to allow scheduling of a future interaction (such as when no agents are currently available), or to immediately contact an agent for further information or assistance (such as when agents are known to be available and ideally able to assist with a particular query). A search engine may then return any information or indicia received alongside results of a search query for presentation to, and optional interaction by, a user.

In another preferred embodiment, a method for providing integrated contact information with search results is disclosed. According to the embodiment, a user may submit a search query, such as when searching for information related to a business or product. A search engine may take this query information (and optionally any additional known information, such as stored data from previous queries), and submit a request to a queue manager. Queue manager may then respond with any relevant queue information, and optionally with interactive indicia to provide interaction options to the requesting user (such as clickable "contact us" buttons, or interactive elements for scheduling a future callback request). The search engine may then present this information or indicia to the user, along with the results of the search query.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
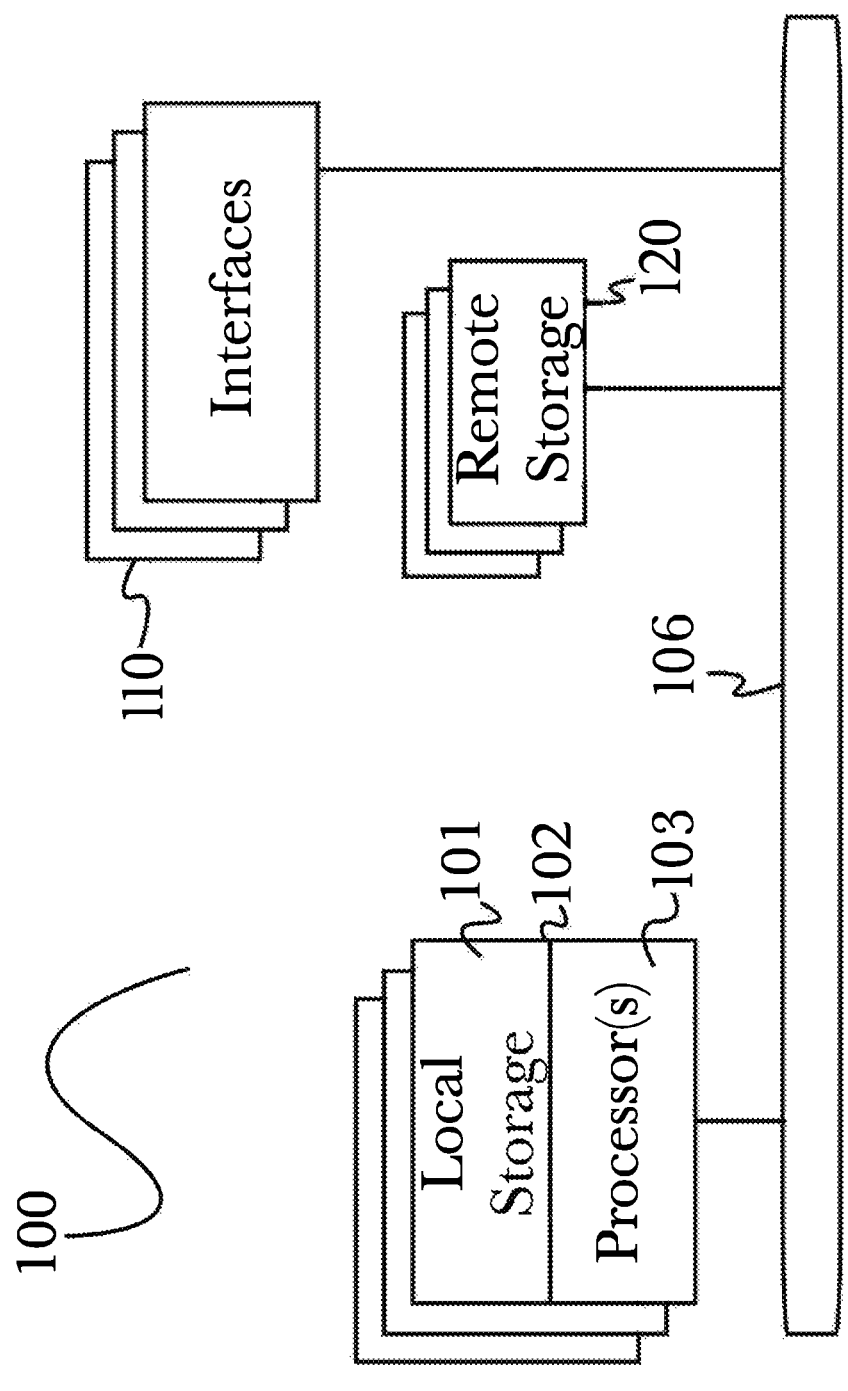
FIG. 1 is a block diagram illustrating an exemplary hardware architecture of a computing device used in an embodiment of the invention.

The inventor has conceived, and reduced to practice, a system and methods for retrieval of contact information for displaying relevant contact information and embedding live queue functionality into search results.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A "resource", as used herein, may refer to any means of satisfying a customer need, such as a contact center agent (such as may respond to customer queries and needs) or other human resource, or any hardware or software product, system or service such as may be utilized for serving customer needs. Such resources may be operated by a corporate entity and (at least in the case of hardware or software resources) may be interacted with in some capacity by customers for various self-service purposes (such as a customer using software to research information or perform operations such as on a customer account). Exemplary resources might include company web servers running web services or a company website, databases or other storage systems, application servers operating software for client or internal use, routing systems for managing communications either internally or with customers or other external individuals, a physical device such as a document printer for printing hard copies of electronic documents, or any other hardware or software system that might be utilized by a business or enterprise. Exemplary human resources might include contact center agents such as for technical support or customer service, sales or service associates such as at a physical storefront, or account management personnel such as dedicated representatives for large corporate accounts. Such resources are exemplary and it should be appreciated that anything may potentially be considered a resource if it is used in such a manner as to serve customers, whether directly or indirectly (such as "behind the scenes" service, as may be the case with technical support personnel that do not directly interact with customers).

A "resource manager", as used herein, may refer to any element that may control access or interaction with resources, such as a software security gateway that might regulate interaction based on security credentials or other criteria.

An "interaction", as used herein, refers to any attempted or successful interaction between an individual consumer and a business contact such as a contact center agent or other representative. Such interactions may occur via any suitable communication means, such as telephone call, voice over internet protocol (VoIP) call, text chat, e-mail, or any other communication method suitable for facilitating interaction between a consumer and a company representative.

An "agent", as used herein, refers to any customer service, sales, or other representative operating or communicating on behalf of a corporate or enterprise entity, such as for receiving and handling interactions with consumers (current or potential customers) or other business individuals.

A "live queue", as used herein, refers to an actively monitored and displayed countdown of an interaction's position in a virtual "queue" or waiting list before being handled by an agent.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or nonvolatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a JAVA™ compiler and may be executed using a Java™ virtual machine or equivalent, or files containing higher level code that may be executed by the computer using an interpreter (for example, scripts written in Python, Perl, Ruby, Groovy, or any other scripting language).

Figure 2:
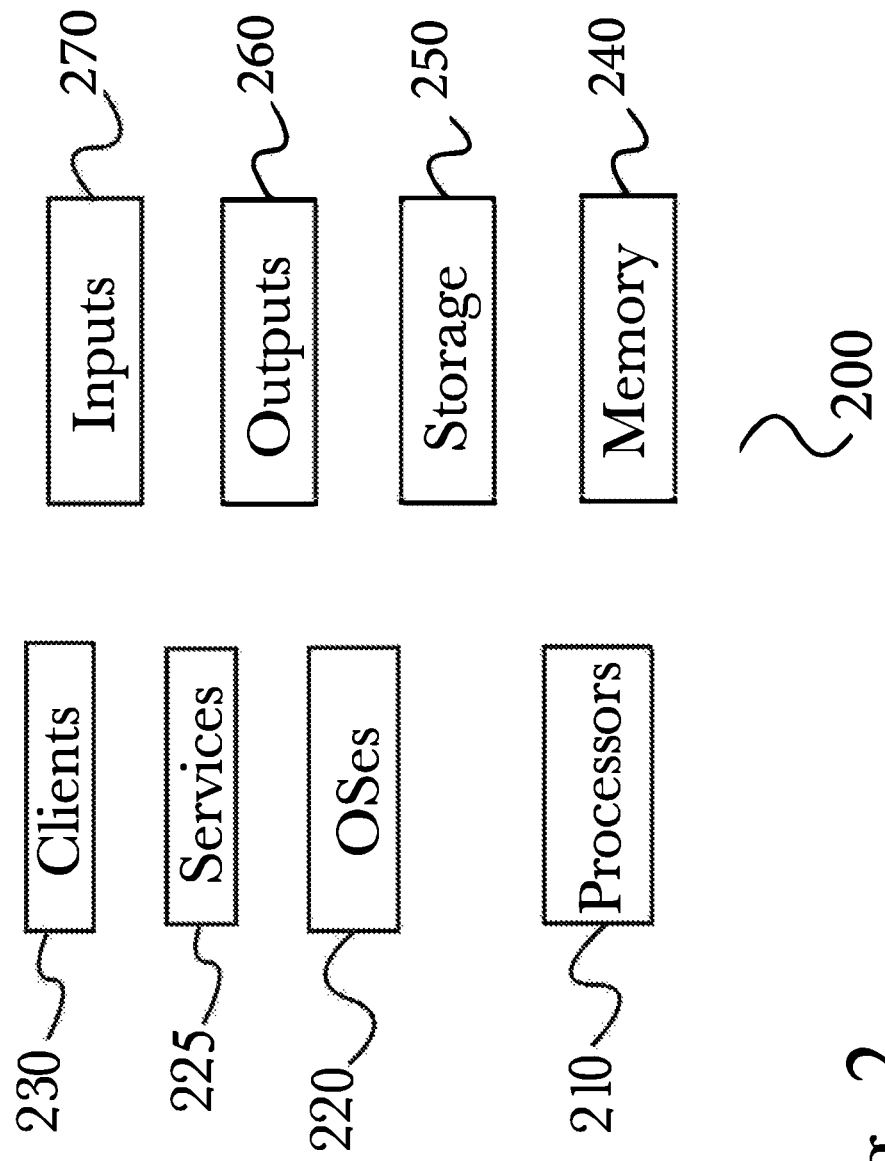
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
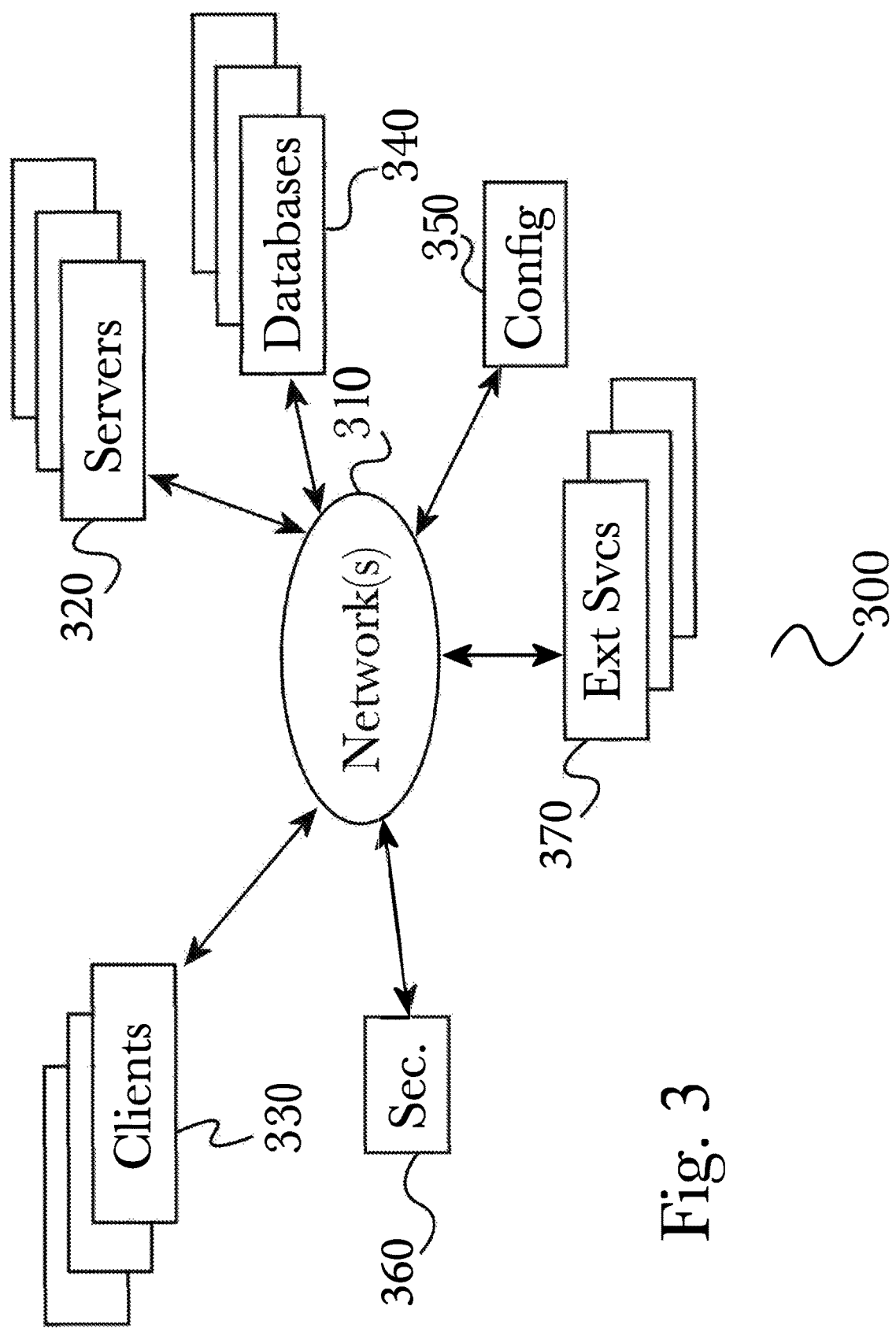
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
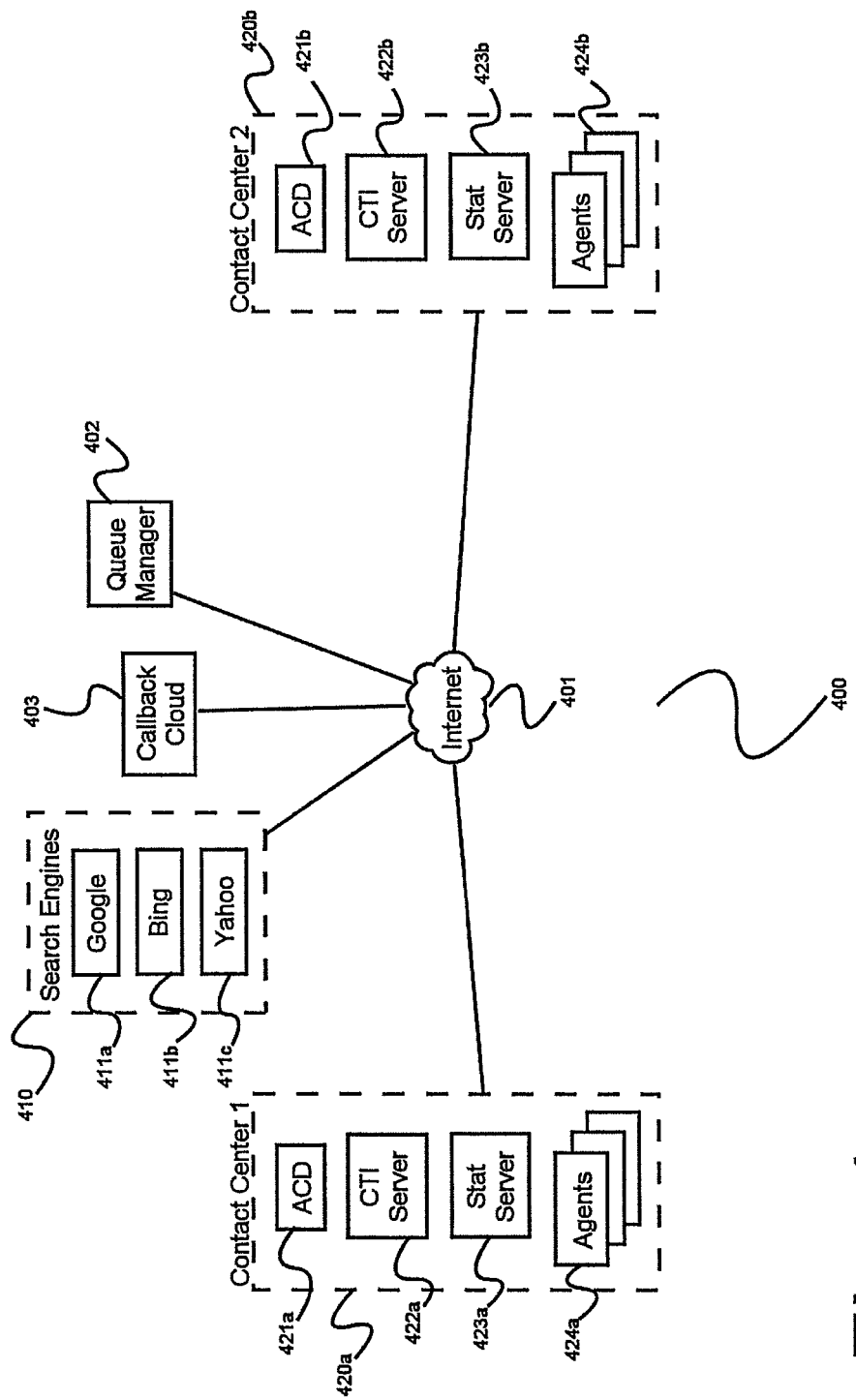
FIG. 4 is a block diagram of an exemplary system architecture according to a preferred embodiment of the invention.

FIG. 4 is an illustration of an exemplary system architecture 400 for integration of contact information with existing search engines for embedded display in search results. As illustrated, a plurality of business contact centers 420 may be connected to and in communication with one another and other systems or devices via the Internet 401 or another communications network. As illustrated, a contact center may comprise several components for basic performance of contact center function, such as including (but not limited to) resource managers such as an automated call distributor (ACD) 421 that may handle distribution or routing of incoming interactions (such as telephone calls) to appropriate agents 424 for handling, CTI server 422 that may handle integration and coordination of computer- or Internet-based interactions with telephony-based interactions (such as might be appropriate when a consumer uses a VoIP program such as SKYPE™ to place a call to a contact center, where agents may be using traditional telephony hardware), and a plurality of contact center agents 424 that may be responsible for receiving and handling inbound interactions, as well as placing and handling outbound interactions. It should be appreciated that the arrangement of contact centers as shown is exemplary, and alternate configurations are possible (such as a contact center with remote agents handled by resource managers, as illustrated below with reference to FIG. 12).

As illustrated, A plurality of search engines 410 such as those operated by service providers such as GOOGLE™ 411*a*, BING™ 411*b*, or YAHOO!™ 411*c* (or any other search engine provider as are common in the art) may be connected to and in communication with other elements of system 400 via the Internet 401 or another communications network. Search engines 410 may be utilized by consumers for querying available information to locate products or services such as might be offered by companies operating contact centers 420 as illustrated, or for retrieving contact information for such companies as might be desirable should a user desire to contact and interact with an agent 424. As further illustrated, system 400 may also comprise a queue manager 402, which may be utilized to operate a virtual queue service wherein a pending consumer interaction may be given a position in a queue (such as based on the time an interaction was initiated) enabling the consumer to pursue other activities while a queue manager 402 may maintain a consumer's position in the virtual queue relative to other interactions, and a callback cloud 403 that may comprise a distributed or cloud-based plurality or network of contact resources such as contact center agents, for such purposes as distributed callback handling (as may be utilized to optimally respond to callbacks without impacting inbound contact center operations, or to respond to callbacks that may be scheduled outside of contact center hours of operation). A more detailed illustration and description of a callback cloud are given below, with reference to FIG. 12. Such a system 400 operates in direct contrast to existing technologies that may require a user to actively wait "on hold" for a queue to process, occupying their time and preventing them from pursuing other activities, and potentially increasing frustration or lowering overall customer satisfaction out of inconvenience.

Detailed Description of Exemplary Embodiments

Figure 5:
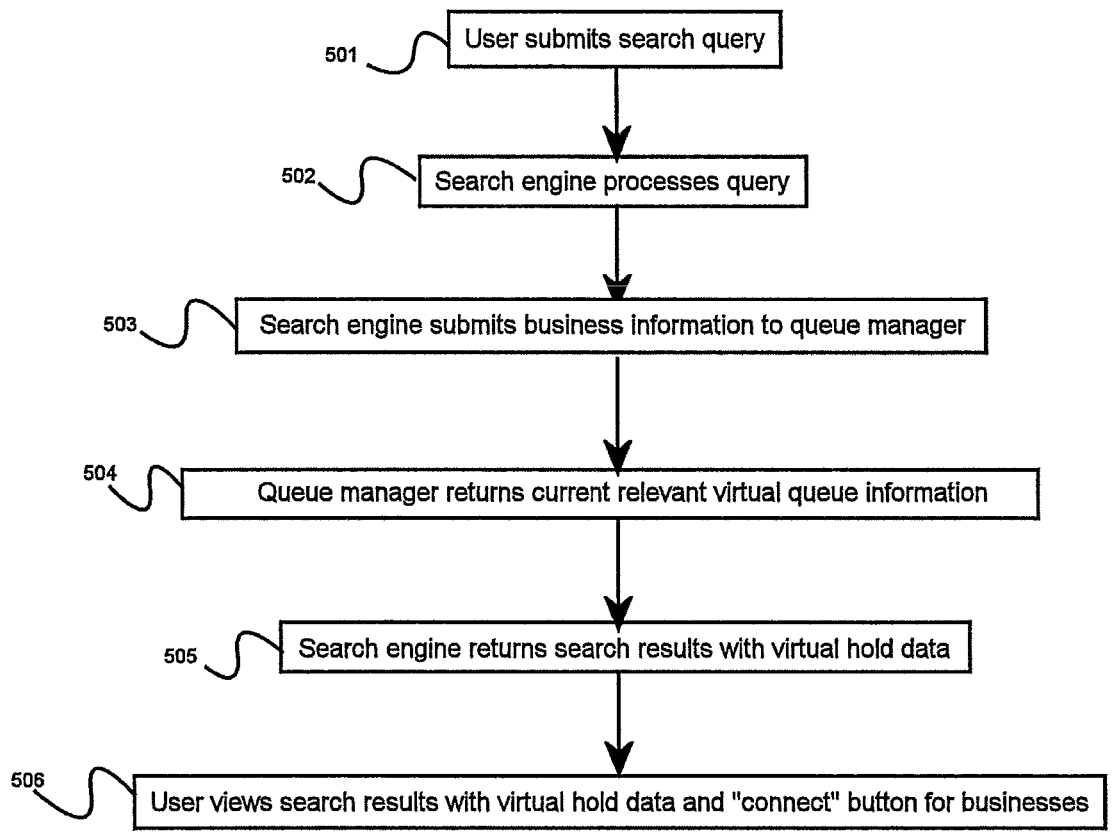
FIG. 5 is a method diagram illustrating an exemplary method for embedding contact information within search results, according to a preferred embodiment of the invention.

FIG. 5 is a method diagram illustrating an exemplary method 500 for operation of a system 400 for retrieval of contact information and live virtual queue data for integration with search results, according to a preferred embodiment of the invention. In an initial step 501, a consumer submits a query via a search engine. Such a search engine may be any of a variety common in the art, and query may be any information query suitable for submission via a search engine, such as searching for information regarding a product or service, looking for information on a known enterprise, attempting to retrieve information on an unknown enterprise using keywords, or any other similar query. It should be appreciated that the content of a query and nature of a search engine are highly variable, and that all queries or search engines described are exemplary and many variant or alternate queries and search engines may be utilized according to the invention.

In a second step 502, a search engine may process a query and produce search results via any of a number of search engine operation paradigms common in the art. It should be appreciated that search engine operation may vary according to the invention, and that search engines are a rapidly developing and evolving field in the art, and any search engine that is or may become available may be utilized according to the invention.

In a next step 503, a search engine may submit identification information for business or establishments found within search results (such as a business name, location, owner information, or any other information that could be used to identify a business) to a queue manager as part of a search operation (in effect, a queue manager may be considered an additional source of information queried during a search operation-specifically, contact and queue information regarding businesses found in search results). Queue manager may operate remotely and independently of a search engine, such as a cloud-based service provided by a third-party service provider or vendor, and may provide additional or alternate functions in addition to operating a virtual queue and presenting queue and contact information for embedding with results from a search engine. In this manner it should be appreciated that a search engine and queue manager may operate independently of one another, or alternately may be operated jointly by a single service provider, and that alternate arrangements may be utilized according to the invention (such as operation of multiple queue managers with specialized functions, or operation of multiple search engines with varying methods of operation or queue manager interaction, or any of a variety of other alternate or additional arrangements that may be possible). It should be further appreciated that a queue manager may be operate in a multi-tenant capacity, i.e. a single instance of a queue manager may be designed and operated such that it may handle a plurality of enterprise interactions in various arrangements (such as operating multiple virtual queues for a single enterprise, or operating queues for multiple enterprises).

In a next step 504, a queue manager may return current virtual queue information (that is, information collected as close as is practical to the moment search results are compiled, thereby presenting a user with the most recent possible data for increased relevancy) pertaining to a business contact center (that may be operated by a business discovered in search results in a previous step) to a search engine, such as current call volume or wait time, number of available agents, or any other information that may be relevant to determining overall operational load of a contact center. It should be appreciated that a variety of information may be collected and sent, and that not all information sent in this manner need be utilized by a particular search engine or query result, and it should be further appreciated that an apparent functional extension of such functionality would be the incorporation of periodic updates from a queue manager, such as frequent updates (such as a refresh of several updates per second) to queue data so as to provide realtime information monitoring to a user viewing search results. In this manner, a user may examine search results and view queue behavior or perform other activities while leaving search results displayed, such that when a user returns to the search results display, current and relevant information may still be displayed without needing to refresh a webpage or resubmit a search query. Additionally, a variety of data may be made available, while individual search engines may be left to determine what data to store or display, facilitating a more compatible and relevant interaction between a search engine and a queue manager.

In a next step 505, a search engine may return results to a consumer, optionally with embedded virtual queue data to improve usefulness of search results. Such embedded data might be, for example, a simple display of how many calls are hold with a particular business, or how long the next customer in a virtual queue (i.e., the next interaction to be handled) has been waiting, or any of a variety of additional or alternate information that may be relevant to a consumer and that may be obtained from a queue manager in a previous step.

In a final step 506, a user is presented with a search results page with virtual queue information displayed, optionally with an additional interactive element (such as a clickable button or other interactive interface element) for initiating a connection with a contact center. Such results may be of varied arrangement and content, as described below (referring to FIGS. 7-9), and a variety of arrangements of information may be presented according to the invention.

Figure 6:
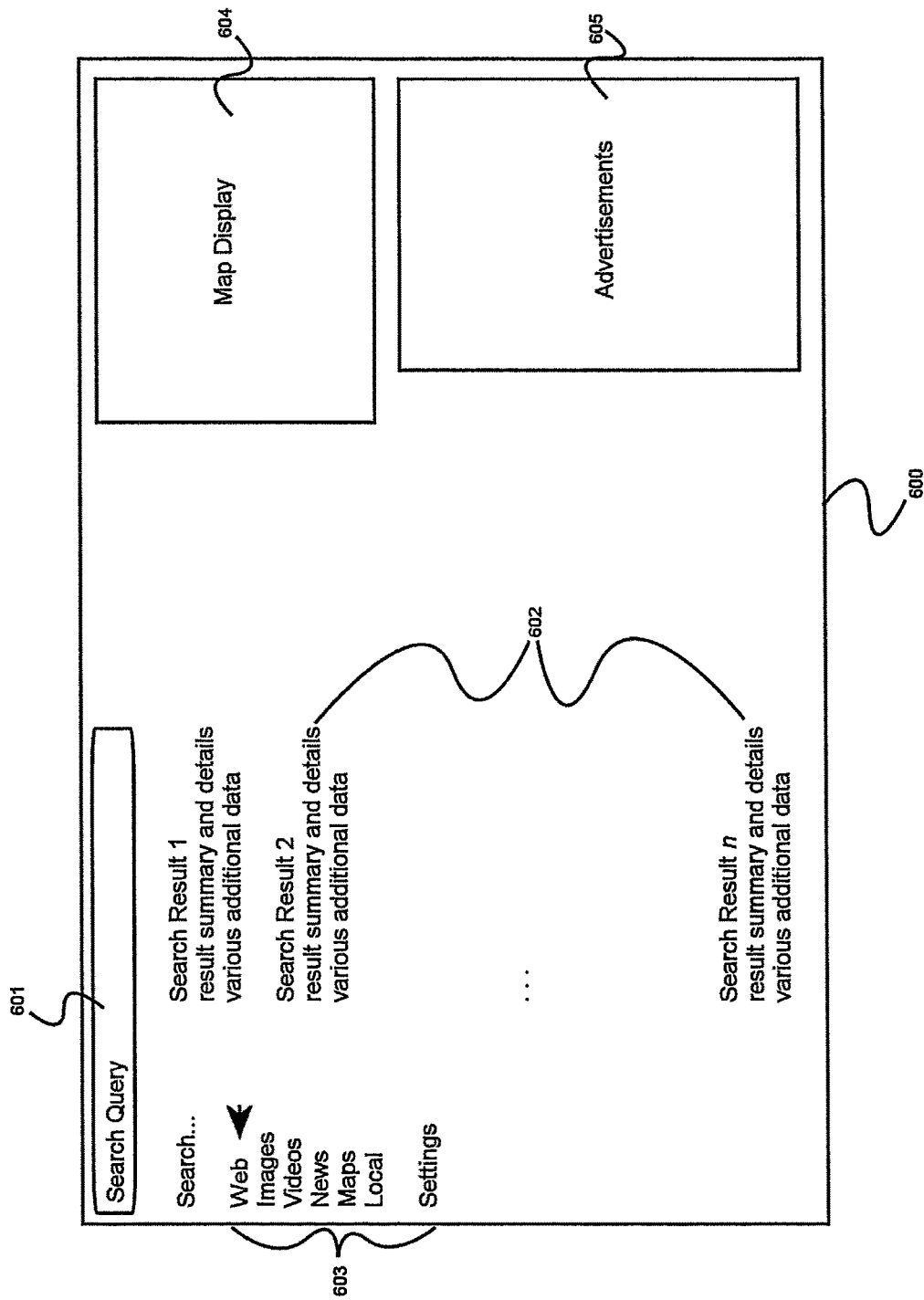
FIG. 6 is a prior art illustration of an exemplary search results page as is common in the art.

FIG. 6 is an illustration of prior art, displaying an exemplary search results display 600 as is currently common in the art. Text shown in the illustration is intended as a placeholder, actual text content may vary however the overall display interface and general content is as illustrated. As shown, a search results display 600 may comprise a text box or similar text input and display interface element 601 such as might display a search query that generated displayed results, a plurality of results of processing a search query 602 that may contain basic information or an overview of a full webpage or location information that returned a result, such as a name or other identifying information, a clickable or selectable link to a webpage URL, or a brief summary of the content of a webpage. The specific content of results may vary, but it should be appreciated that the general content and intent of a results entry remains similar, i.e. a concise summary of a webpage that returned a result to a search query. Display 600 may further comprise a plurality of clickable, selectable, or otherwise interactive interface elements 603 for manipulating a search query, such as searching for particular types of web content (such as news articles or images), or configuring search preferences (such as how to filter or sort results prior to display), a static or interactive interface region 604 that may display a map such as might display locations of local search results, and a static or interactive interface region 605 that may display general or targeted advertisements such as might be based on search history or browser history. It will be appreciated that display 600 as illustrated is representative of standard features common to many search engines commonly used in the art, and that such displays may comprise additional or alternate elements while retaining the basic utility and standard features illustrated.

Figure 7:
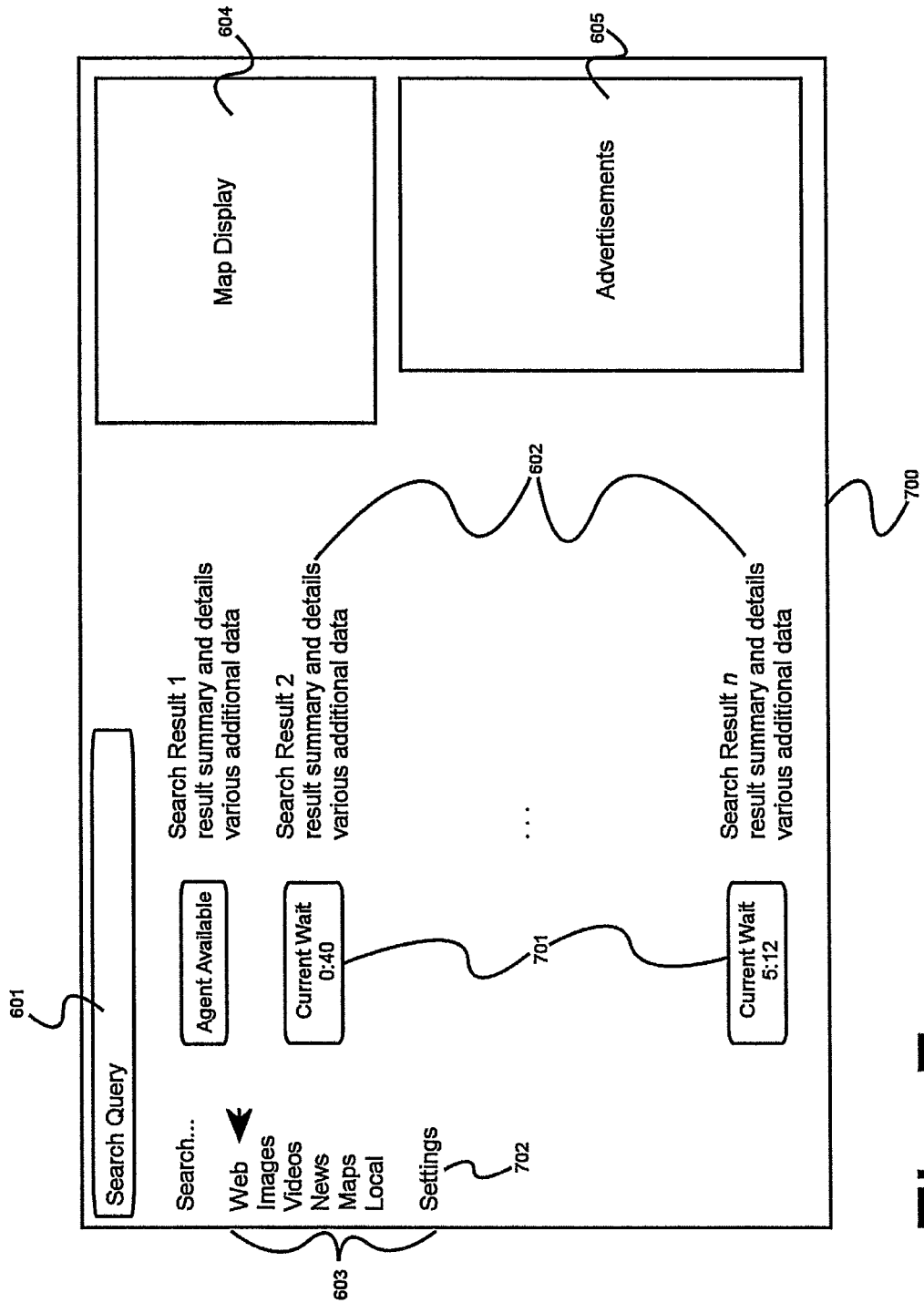
FIG. 7 is an illustration of an exemplary search results overview page with embedded contact data, according to a preferred embodiment of the invention.

FIG. 7 is an interface diagram illustrating an exemplary search results display 700 incorporating virtual queue information 710 embedded within search results 602, according to an embodiment of the invention. As illustrated, a search results display 700 may be similar to those currently found in the art (such as exemplary display 600 described previously), but with the addition of virtual queue information 701 such as may be reported by a queue manager (as described previously, referring to FIG. 5). directly embedded or otherwise incorporated within search results 602 prior to display, to present a user with a unified and cohesive, meaningful display that provides new information (current call volume or wait time information) not possible with current solutions.

As illustrated, virtual queue data 701 may be displayed within or alongside search results, and may comprise any potentially-relevant information regarding contact center traffic that may be useful to a consumer (who might be considering contacting a center), such as (as illustrated) notifying a user that an agent is currently available (and thus signifying immediate service), or displaying a currently-expected wait time before an interaction will be handled (so as to give a user the opportunity to make a more informed decision regarding whether to contact a company or which contact center to contact). It should be appreciated that additional or alternate queue information may be collected and displayed according to the invention, and such information might be configurable by a user such as via a search engine settings menu 702, which could (for example) give a user configuration options for selecting what types of information should be displayed, controlling the nature of displayed information such as shape, style, or positioning of display elements, or setting different display options for different types of information or configurable thresholds (such as configuring hold time measurement to be displayed within a square button-style element and current call volume to display to the right of search results, or to display wait times longer than a selected time interval to be displayed in red text while those shorter may be displayed in green text). It should be appreciated that the nature and display of such information may be highly configurable according to the invention, and furthermore that such configuration may be stored such as via existing user account profiles associated with search engines (such as a GOOGLE™ account that may store personal search preferences for the Google search engine).

Figure 8:
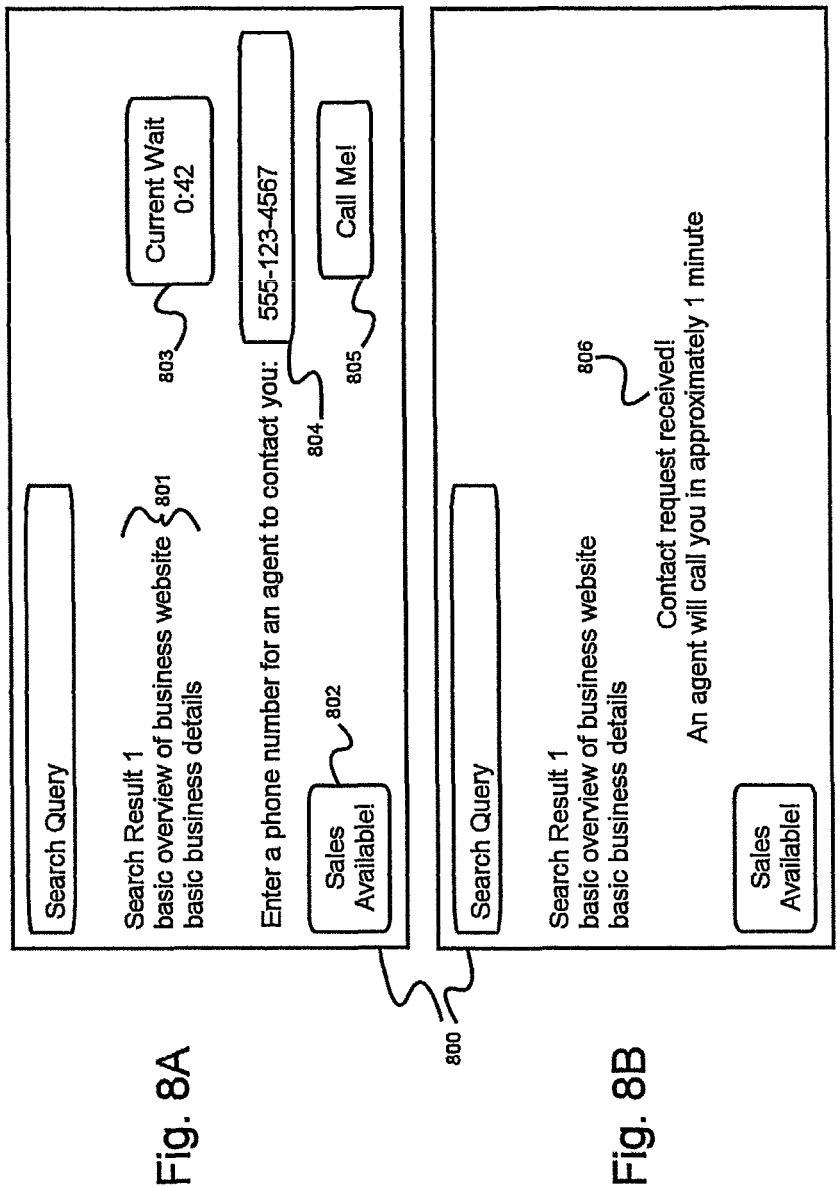
FIG. 8 is an illustration of a detailed search results page showing embedded contact data and live queue data, according to an embodiment of the invention.

FIG. 8 is an interface illustration showing two exemplary detailed search results 800 comprising a search result 801, virtual queue information such as what agent skills or departments are available 802, current call wait time 803, and connection interaction elements such as a text input field such as to accept a user's contact number 804, a clickable or otherwise interactive element such as a button 805 such as to submit a user's input contact number for requesting a callback interaction, and a resulting confirmation message 806 that may incorporate virtual queue data to present a user with an expected time to fulfillment.

As illustrated, a particular search result 801 may be displayed in a "zoomed in" or more detailed manner, with additional information embedded in a results display 800. Exemplary information as illustrated may comprise any of a variety of potentially relevant virtual queue information, such as to provide a user with information with which to make an informed decision regarding contacting a business or requesting an agent.

As illustrated, if an agent is unavailable (as illustrated by a call wait time 803 indicating all agents are currently occupied), a user may be given the option to request an outbound interaction from an agent when one becomes available (allowing a user to pursue other activities while maintaining their position in a virtual queue, rather than wait on hold for an extended period). As illustrated, a user may be prompted to enter their own contact information such as (as illustrated) a telephone number where they may be reached, or any other personal contact information that may be available such as an e-mail address, chat client information, or other contact information. A user may be given the ability to submit their information to a callback cloud for outbound contact such as via a clickable button 605 or other interactive interface element, which may be treated as an inbound interaction for such purposes as positioning within a virtual queue. When a user submits contact information and requests contact from an agent, a confirmation message may be displayed to alert a user that their request was successfully received and placed in a virtual queue for handling. Such a confirmation might comprise virtual queue information such as an approximate time to expect contact from an agent, such as to set reasonable expectations with a user to improve perception of customer service. A contact request may be sent to a callback cloud (as described previously, referring to FIG. 4) where it may be routed to an agent with appropriate skills, tools, or schedule availability to optimally handle a user's contact request. When a contact request is handled, an agent operating within a callback cloud may place an outbound interaction to attempt to contact a user using contact information previously entered by a user (as described above when initially requesting a callback), completing an interaction with a user without having required the user to waste any time waiting on hold or navigating multiple web pages searching for relevant information, thereby improving customer experience and business efficiency.

Figure 9:
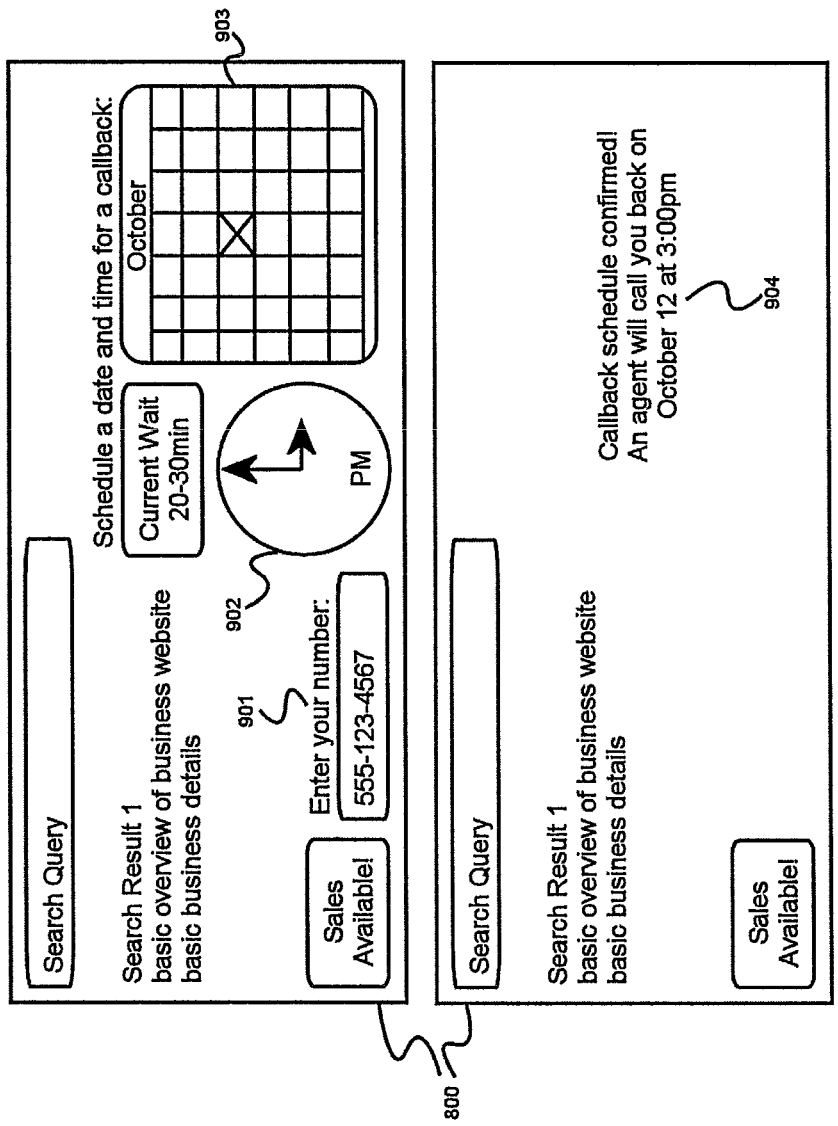
FIG. 9 is an illustration of a detailed search results page showing embedded callback interface and callback confirmation, according to an embodiment of the invention.

FIG. 9 is an interface illustration showing two exemplary detailed search results 800 comprising input elements such as a text input field 901 such as for a user to input a contact number where they may be reached, interactive clock 902 or calendar 903 elements for selecting a time and date for scheduling a contact request, and a confirmation message 904 such as to notify a user that a contact request was successfully submitted and scheduled. In this manner, a user may choose to schedule an outbound callback with a contact center, such as if a wait time is high (as illustrated) or if a user simply desires to schedule a callback for a future time interval (such as, for example, if a user is out of town but anticipates needing contact upon return), such that a user may request contact from a callback cloud agent at a time that is convenient. Such elements as illustrated are exemplary and may vary in form or position, and alternate or additional elements may be utilized according to the invention. A further functionality that might be implemented could be a scheduling engine that may utilize virtual queue information such as historical patterns or predicted contact center load, such as to provide a calendar functionality wherein a user may be shown predicted agent availability when deciding how to schedule a callback, so as to make a more informed decision—for example, a user might desire to avoid a busy day if they have a complicated issue and expect to be on the phone for an extended period with an agent. It should be appreciated that all elements and arrangements illustrated and functions described are exemplary in nature and additional or alternate functions or elements may be utilized according to the invention.

Figure 10:
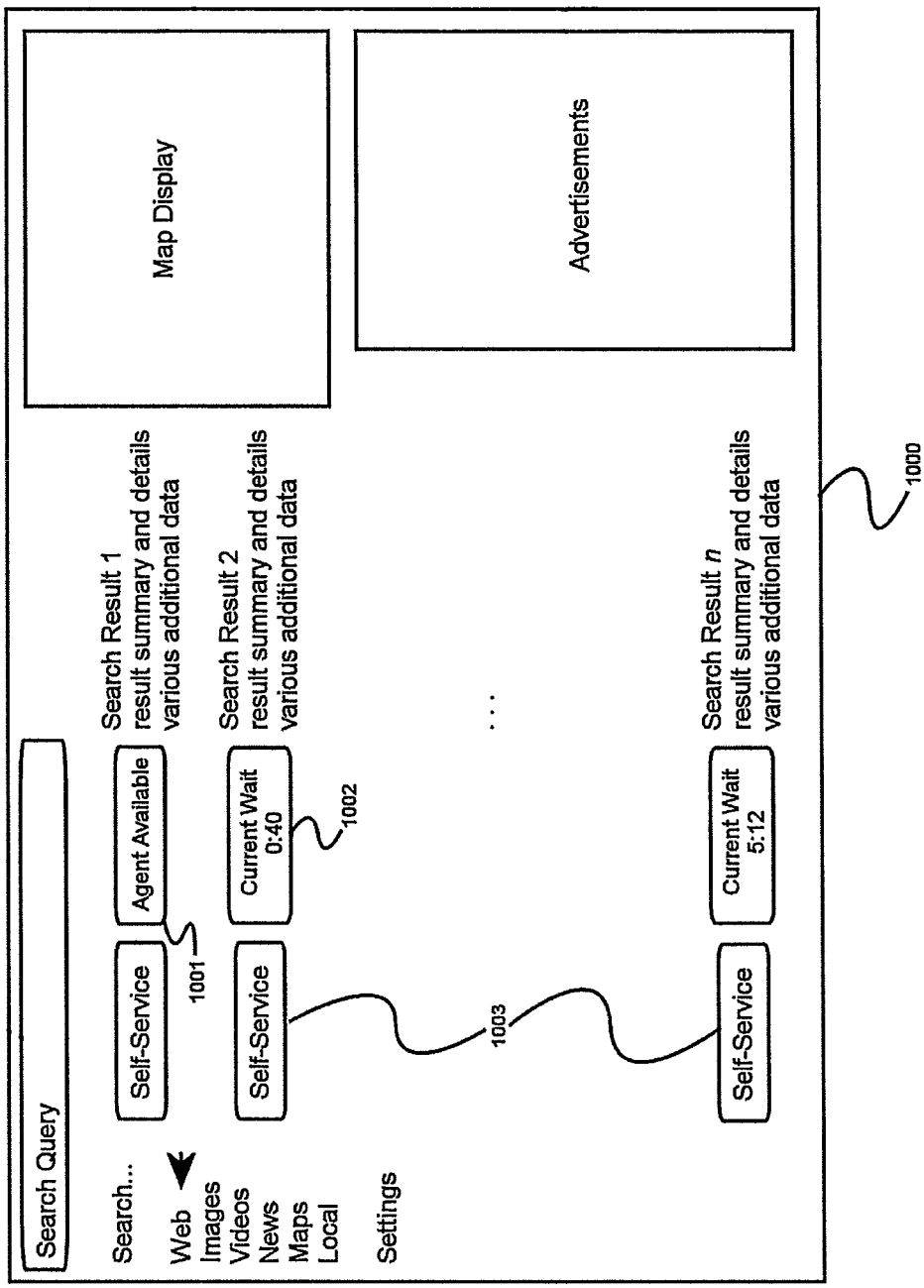
FIG. 10 is an illustration of a search results overview page showing embedded contact data and self-service interface elements, according to an embodiment of the invention.

FIG. 10 is an illustration of an exemplary search results display 1000 comprising embedded virtual queue data such as agent availability statistics 1001, current call wait times 1002, and an interactive self-service element 1003, which may allow a user to choose to pursue available self-service options according to a particular business or contact, such as (for example) a skilled user opting to use online software configuration tools to configure a new cable or digital subscriber line (DSL) internet service connection, rather than contact an agent for assistance with installation. It should be appreciated that such elements may vary in arrangement or design, and that additional or alternate elements may be utilized according to the invention, and it should be further appreciated that the described use case is exemplary and a wide variety of self-service solutions and techniques may be made available to users via an interactive interface element 1003, and that additional features or implementations may become available and be utilized according to the invention.

Figure 11:
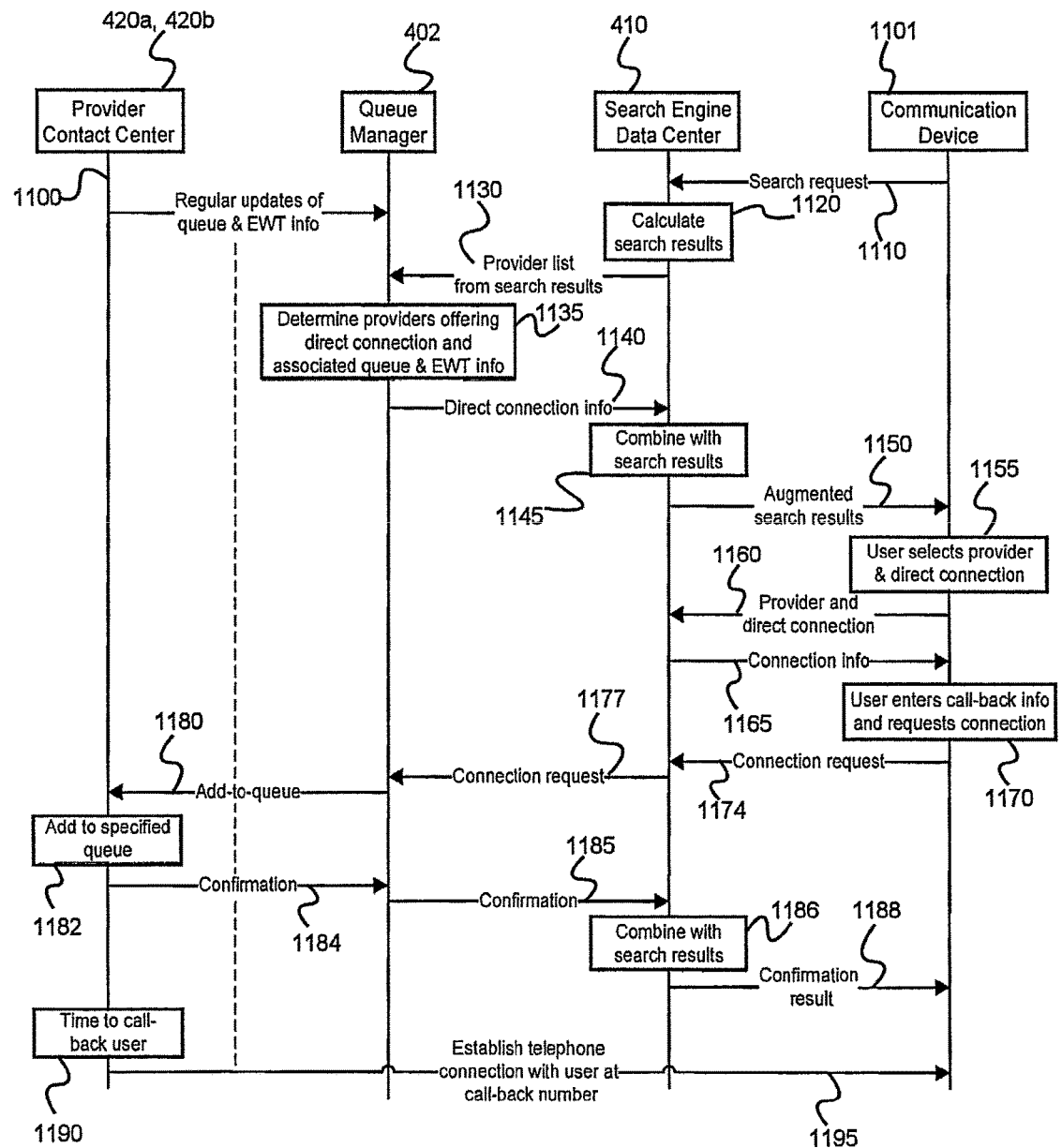
FIG. 11 is a flow diagram illustrating an exemplary flow of message signals between exemplary components of a system providing embedded data within search results, according to an embodiment of the invention.

FIG. 11 is a flow diagram illustrating an exemplary flow of messaging signals between various interconnected components of a system for embedded search result information. As shown by signal 1100, a plurality of provider contact centers 420*a*, 420*b* (referring to FIG. 4) may provide a queue manager 402 with updates of available queues and corresponding expected wait time (EWT) information. This may be done continuously at any periodic interval, e.g., every second. At a certain point, a user's communication device 1101 may send a search request 1110 to a plurality of search engines 410, which may comprise one or more search terms input by device 1101.

In some embodiments, a search engine may calculate search results for a user's search term in block 1120, then send a list of providers comprising the search results to queue manager 402 via message 1130. In block 1135, queue manager 402 may determine which of the list of providers received in message 1130 offer direct connection services to users via queue manager 1135. For example, the received list may comprise other providers who do not offer such services in addition to one or more of the providers who offer such services such as contacts centers 420*a* and 420*b*. In such case, the queue manager would only select from the list the one or more providers corresponding to centers 420*a* or 420*b*. For the selected providers, the queue manager also determines in block 1135 the types of services offered (e.g., sales, customer service, general inquiry, etc.), the types of direct connections available for each service (e.g., immediate connection, scheduled call-back connection, queued call-back connection), and, where applicable, the expected wait time (EWT) for each service queue. Queue manager 402 may then send this information to the requesting search engine data center via message 1140, which also may comprise contact information (e.g., telephone numbers) for the respective providers and/or services, and self-service information for the provider (e.g., URL of the provider's customer service web page).

In other embodiments, search engines 410 may store a list of providers associated with queue manager 402 that offer direct connection services. This list may be updated periodically or occasionally based on information received by search engines 410 from queue manager 402. In these embodiments, a search engine may determine which of the providers comprising the search results determined in block 1120 offer direct connection service based on the stored list. Accordingly, message 1130 may comprise only the providers determined to offer direct connection services, and the operation in block 1135 may comprise the queue manager determining, for each provider in the list, the types of services offered (e.g., sales, customer service, general inquiry, etc.), the types of direct connections available for each service, and, where applicable, the expected wait time for each service queue.

The expected wait time value may represent an estimated wait time calculated using primary estimated wait time techniques such as projecting a wait time based on the quantity of clients in the queue and any of a historical, present, or projected time allotment for handling each such queued client. Alternatively, the expected wait time value may be a function of both a primary estimated wait time calculation and a wait time augmentation calculation made based on service agent availability and/or scheduled change in service agent availability.

In block 1145, search engines 410 may combine the queue and EWT info received in message 1140 with the search results generated in block 1120 and sends the augmented search results to the communication device via message 1150. The communication device receives and parses this message, then displays the augmented search results to the user on a screen display, such as the screen display embodiments shown in and described above with reference to FIGS. 7, 8, 9, and 10. A screen display may comprise one or more display elements, (e.g., icons), for the user to select a particular provider and queue and, in some embodiments, to enter call-back information such as the user's phone number. A screen display also may comprise display elements (e.g., icons) that, when selected by the user, cause the device to initiate a telephone call to the provider or to initiate self-service via the provider's web site. In block 1155, a device may receive a user's selection of a particular provider and service, which subsequently is sent to the search engine data center in connection request message 1160.

After receiving message 1160, a search engine may reply to a device with direct connection information message 1165, which may comprise information that can be used by the device to render a screen display such as those shown in and described above with reference to FIGS. 8 and 9. The display screen may comprise a user input portion by which the user can enter call-back information such as phone number, time, and date. After rendering the screen display and capturing the necessary input from the user in block 1170, the device sends a connection request message 1174 to the search engine data center. Message 1174 comprises the selected provider and service, type of requested direct connection, and any call-back information received from the user in block 1170. The data center then sends to the queue manager connection request message 1177, which may comprise substantially the same fields as message 1174. Although not shown on the figure, the search engine data center may also collect, store, aggregate, and/or process the information from message 1174 pertaining to the selection of the particular provider and direct connection service by the user. The search engine provider may later use this information for billing the contact center providers based on user access to direct connection services via the provided search results. Depending on the embodiment, contact center providers or others may be charged each time a consumer selects a provider and direction connection from search results; each time a user requests a connection, e.g., to be added to a queue; or each time a connection originating from the search results is actually completed. Other embodiments may include charges for more than one of these events, with different rates applying to each charge.

After receiving the connection request message 1177, the queue manager sends an connection request message 1180 to the provider contact center identified in message 1177. Message 1180 comprises the particular service, type of direct connection, and any call back information included in message 1177. In block 1182, the provider contact center attempts to according to the parameters contained in message 1180. For example, if the user requested a queued call-back type of direct connection, in block 1182 the provider contact center attempts to add the user to the queue corresponding to the requested type of service (e.g., sales, customer service, warranty claim, repair, etc.). If successful, the provider contact center responds to the queue manager with message 1184, indicating that the user's connection request has been added to the queue selected in block 1155. Message 1184 may further comprise the latest available EWT for the queue to which the user's connection request was added. Alternately, if the queue manager is unable to add the user's connection request to the selected queue, this will be indicated in a confirmation message 1184. In the case where the user has requested a scheduled call-back connection, confirmation message 1184 may comprise other available call-back times if the call-back time requested by the user is not available, which may cause the user's communication device to prompt the user to select from among these.

After receiving a confirmation message 1184 from the provider contact center, the queue manager sends confirmation message 1185 to the search engine data center; this message may comprise substantially the same fields as confirmation message 1184. The data center may also collect, store, aggregate, and/or process the information from message 1185 for use in billing the contact center providers or other entities for facilitating direct connection services via search results. The data center subsequently combines at least a portion of the information in confirmation message 1185 with at least a portion of the search results determined in block 1120 (e.g., the information pertaining to the selected provider) in block 1186, then sends the combined information to the device in message 1187. The message 1187 may comprise, for example, a confirmation web page such as the exemplary ones shown in FIGS. 8B and 9B.

Meanwhile, in block 1190, the selected provider contact center (e.g., contact center 420b in FIG. 4) determines that it is time to call back the user who was added to the call back queue in block 1182. If the user has not scheduled a particular call-back time, this time may occur when the user's call-back request reaches a particular point in the selected queue, e.g., next in line for a service or sales agent. If the user has scheduled a particular call-back time, then the provider contact center waits until that scheduled time in block 1190. In either case, at the given time, the provider contact center establishes a call-back telephone connection 1195. This telephone connection may be via a circuit-switched telephony network, such as the public switched telephone network (PSTN) or public land mobile network (PLMN), or via a packet-switched network, such as the Internet, using an alternative technology such as voice-over-IP (VoIP). In some embodiments, the telephone connection 1195 may be a video telephony connection. In this manner, the user is able to engage in a conversation with a representative of a selected provider without the frustrations of long waits in a queue. In some embodiments, the user may specify a call back telephone number such that the user may receive a call-back connection (scheduled or queue) on any device that can accept telephone calls to the call-back number, not merely on the same device used to initiate the Internet search. Depending on the particular device's capabilities, the user may be able to use various types of telecommunication applications to connect with a provider, including various applications such as Skype that transmit and receive voice and/or video information using standard and/or proprietary Internet communication protocols.

Figure 12:
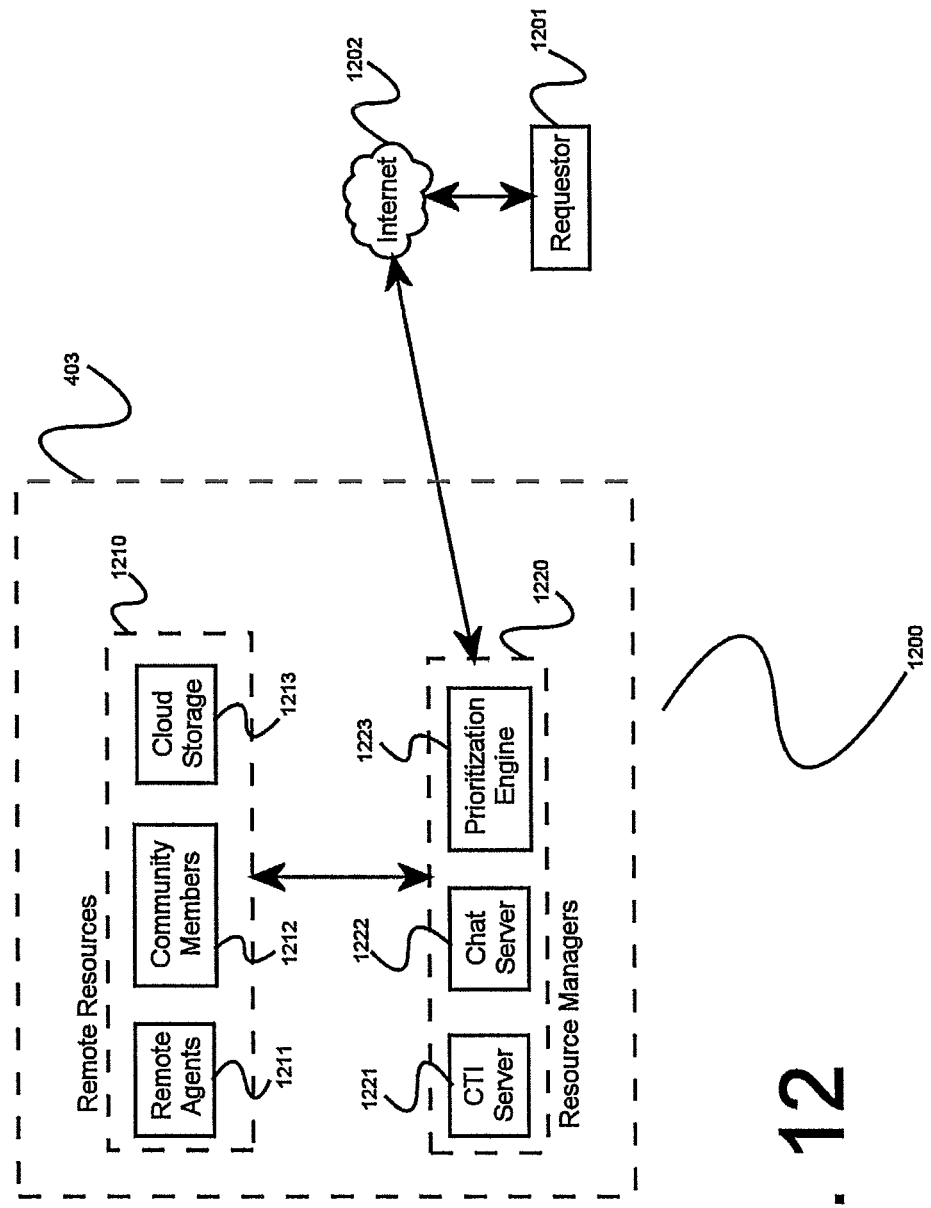
FIG. 12 is a block diagram of a variant architecture, illustrating the use of distributed resources according to an embodiment of the invention.

FIG. 12 is a block diagram of an exemplary callback cloud 403 utilizing remote resources 1210 and resource managers such as to provide additional functionality. As illustrated, a requestor 1201 such as a search engine may interact with a callback cloud via the Internet 1202 or similar communications network. Callback cloud 403 may comprise a plurality of remote or distributed resources 1210 such as (for example) remote contact center agents 1211, remote community members 1212, or cloud-based storage 1213. Remote contact agents 1211 may operate independently or jointly as in a traditional contact center interchangeably according to the invention, being unified by a resource manager such as (for example) a CTI server 1221. In this manner, a variety of arrangement of contact agents 1211 may be possible while maintaining a consistent customer experience by controlling interaction with those agents via a resource manager. For example, agents may operate at different time intervals and a resource manager may track their availability such as to allow interactions at any time of day by routing to agents that are available at that particular time.

Remote community members 1212 may comprise any individuals connected to a resource manager that may interact with a user such as via a chat dialogue, or that may provide information in response to a search query. These may not necessarily be contact center agents or technical personnel, but may simply be other users who choose to be available to assist when needed based on their own knowledge or skills. A resource manager such as a chat server 1222 may manage interactions with such members, such as (for example) when a user searches for information regarding a product or service, they might be presented with an option to chat with another user of that product or service (such as via embedded elements as described above).

Cloud-based storage 1213 may be any of a number of distributed information storage solutions as are common in the art, and may further comprise user-generated storage such as shared files on a user's personal computer (for example). In this manner, search queries may index and utilize information not normally available, by utilizing data made accessible by other community members (such as those described above as remote community members 1212) to further refine search results.

A further function of utilizing such distributed resources as illustrated in conjunction with resource managers to unify them, is that a resource manager such as a prioritization engine 1223 may receive search result information from other resources and resource managers, then perform analysis of results to determine such data as relevancy or availability of resources in order to "rank" or prioritize results prior to presenting them to a user. Such function is described in greater detail below, with reference to FIG. 13.

Figure 13:
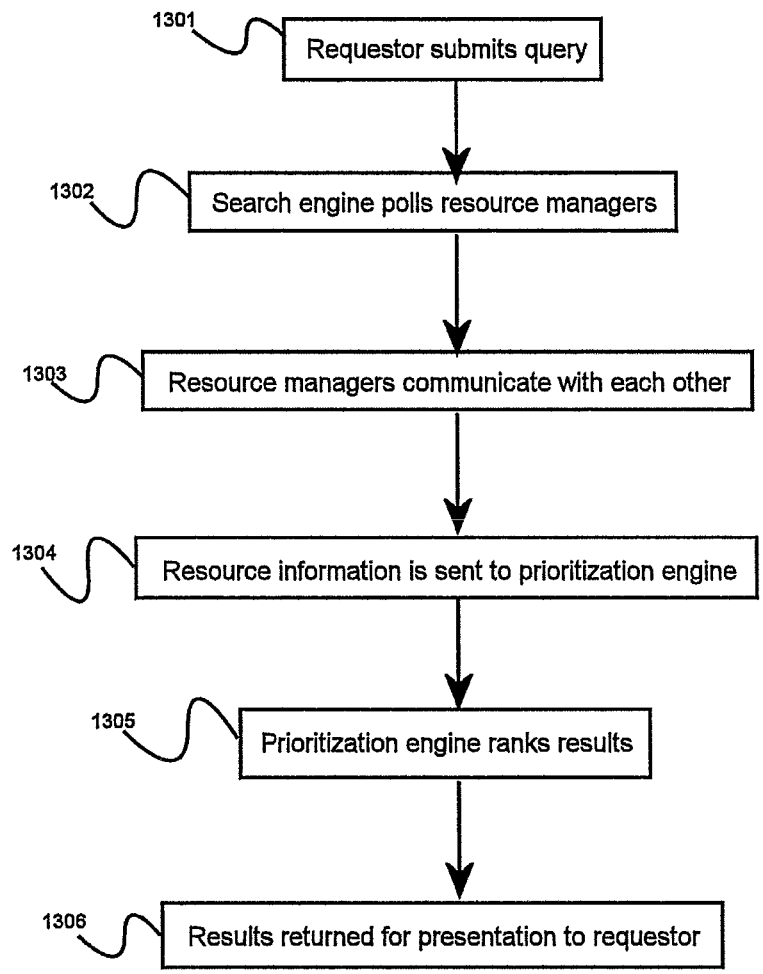
FIG. 13 is a method diagram illustrating prioritization of search results based on resource managers, according to an embodiment of the invention.

FIG. 13 is a method diagram illustrating an exemplary method for prioritization of search results utilizing remote resources and resource managers as described above in FIG. 12. As illustrated, in an initial step 1301 a user may submit a search query such as via a traditional search engine as are common in the art. It should be appreciated that due to the nature of remote resources and the use of resource managers to control and unify access or interaction with such resources, integration with existing search services and technologies is possible and the systems of the invention may be readily adapted to new or alternate search technologies as needed.

In a next step 1302, a search engine may query or poll resource managers to incorporate their respective resources in search results. This may incorporate the presence or availability of resources (such as whether a contact center agent is available), or more detailed information such as whether a particular agent is available, or how many agents are online in a particular area. It should be appreciated that due to the use of resource managers, a variety of functionalities may be possible according to the invention and additional functionality may be easily incorporated by modifying resource manager behavior without necessarily needing to make changes to resources themselves (further promoting flexibility and adaptability).

In a next step 1303, a resource manager may interact with other resource managers that may or may not themselves be directly accessible to a search engine for querying. Such an arrangement might be, for example, a publically-accessible resource manager that then interacts with a company's internal manager (such as a call status server) for such purposes as to gain more detailed information regarding available resources.

In a next step 1304, resource information may then be passed to a prioritization engine or similar resource manager. It should be appreciated that the use of such a manager may provide a "tiered" effect with regards to resources and manager, i.e. resources may be managed by their respective resource managers and those managers may then be managed by higher-level resource managers. In this manner, a nested approach may be utilized when appropriate according to the invention, offering new or alternate functionality to a callback cloud.

In a next step 1305, a prioritization engine may process results of resource querying and based on the initial query performed, rank or order such results for presentation to a user (such as via a search results webpage display). In a final step 1306, these ordered results may then be returned to the initial requestor (such as a search engine), for presentation to a user.

The skilled person will be aware of a range of possible modifications of the various embodiments described above. Accordingly, the present invention is defined by the claims and their equivalents.

What is claimed is:

1. A system for contact information integration with a third party Internet search engine search results, comprising:
   a callback cloud comprising a plurality of server computers configured to generate callbacks to the plurality of agents;
   a queue manager, comprising at least a plurality of software programming instructions stored in a memory of, and operating on a processor of, a network-connected computing device configured to connect to and communicate with the callback cloud;
   wherein the callback cloud receives a request for agent availability information from a third party Internet search engine;
   wherein the queue manager monitors agent availability across the plurality of contact centers based at least in part on observed agent activity;
   wherein the queue manager queries at least a first contact center for agent availability and estimated wait time for handling the customer interaction;
   wherein the queue manager provides agent availability information to the callback cloud, and determines an estimated wait time based at least in part on agent availability, and provides the estimated wait time to the callback cloud;
   wherein the callback cloud provides a status update to the third party Internet search engine, the status update being based at least in part on agent availability information received from the queue manager; and
   further wherein, when a third party Internet search engine user initiates a callback request from within a search query result, the third party Internet search engine sends a request to the callback cloud and the callback cloud initiates a callback to the party when an agent is available and bridges the callback to the available agent.

2. The system of claim 1, wherein the queue manager responds to a request with interactive indicia;
   wherein the indicia provide availability information, based at least in part on information collected by the queue manager, to the requester; and
   further wherein the indicia enable scheduling of an interaction with a contact agent based at least in part on agent availability information.

3. The system of claim 2, wherein the third party Internet search engine submits query information to the queue manager, based at least in part on a first third party Internet search query;
   wherein the query information comprises at least business information to identify a business relevant to a first third party Internet search query;
   wherein the queue manager returns relevant contact information based at least in part on information received from the third party Internet search engine; and
   further wherein the third party Internet search engine includes contact information when presenting the results of a query.

4. The system of claim 3, further wherein the queue manager provides interactive indicia with contact information based at least in part on agent availability information;
   wherein the third party Internet search engine presents the indicia with contact information and query results.

5. A method for contact information integration with search results, comprising at least the steps of:
   monitoring, using a queue manager comprising at least a plurality of software programming instructions stored in a memory of, and operating on a processor of, a network-connected computing device configured to connect to and communicate with a callback cloud, wherein the callback cloud comprises a plurality of server computers configured to generate callbacks to a plurality of agents, agent availability across a plurality of contact centers based at least in part on observed agent activity;
   receiving, at the callback cloud, a request for agent availability information from a third party Internet search engine;
   querying, using a queue manager, at least a first contact center for agent availability and estimated wait time for handling the customer interaction;
   providing, using the queue manager, agent availability information to the callback cloud;
   determining an estimated wait time based at least in part on agent availability;
   providing the estimated wait time to the callback cloud;
   providing a status update to the third party Internet search engine, the status update being based at least in part on agent availability information received from the queue manager; and
   when a third party Internet search engine user initiates a callback request from within a third party search query result, sending from the third party Internet search engine a request to the callback cloud and the callback cloud initiates a callback to the party when an agent is available and bridges the callback to the available agent.

6. The method of claim 5, further comprising the steps of:
providing an indicia of estimated wait time, based at least in part on the agent availability information obtained by the queue manager from the plurality of contact centers, to the third party Internet search engine.

7. The method of claim 6, further comprising the steps of:
using the indicia of estimated wait time to schedule an interaction request with a callback cloud;
sending a first scheduled interaction request to the queue manager;
routing, by the queue manager, the first scheduled interaction request to a contact center according to availability information based at least in part on observed agent availability;
receiving the scheduled interaction request at a device associated with a first contact center agent; and
initiating a callback from the callback cloud at the scheduled time and bridging the callback to the first contact center agent.

* * * * *